United States Patent [19]

Tomita et al.

[11] 4,400,184
[45] Aug. 23, 1983

[54] SYSTEM FOR RECOVERING PRESSURE AND SENSIBLE HEAT FROM BLAST FURNACE GAS WITH USE OF DRY-TYPE DUST COLLECTOR

[75] Inventors: Yukio Tomita, Osaka; Takayuki Wakabayashi, Takatsuki; Noriyuki Oda, Sennan; Hirotaka Yamamoto, Takatsuki, all of Japan

[73] Assignee: Hitachi Shipbuilding and Engineering Company Limited, Osaka, Japan

[21] Appl. No.: 346,190

[22] Filed: Feb. 5, 1982

Related U.S. Application Data

[63] Continuation of Ser. No. 147,200, May 6, 1980, abandoned.

[30] Foreign Application Priority Data

May 18, 1979 [JP] Japan .................................. 54-62021
May 18, 1979 [JP] Japan .................................. 54-62023

[51] Int. Cl.³ .......................... B03C 3/01; B01D 51/00
[52] U.S. Cl. .......................................... 55/106; 55/122; 55/135; 55/227; 55/259; 55/266; 55/267; 55/270; 55/DIG. 30; 55/DIG. 34; 261/67; 261/116; 261/117; 261/DIG. 9; 261/DIG. 74
[58] Field of Search ................. 55/227, 261, 266, 267, 55/270, 20, DIG. 30, DIG. 34, 106, 122, 135, 259; 261/67, 116-117, DIG. 9, DIG. 74

[56] References Cited

U.S. PATENT DOCUMENTS

| | | | |
|---|---|---|---|
| 2,673,620 | 3/1954 | Montgomery | 55/227 X |
| 2,911,061 | 11/1959 | Petersen | 55/227 X |
| 3,212,761 | 10/1965 | Willett | 55/227 X |
| 3,282,514 | 11/1966 | Putz | 55/20 X |
| 3,338,029 | 8/1967 | Warfield, Jr. | 55/227 X |
| 3,395,510 | 8/1968 | Barnes | 55/227 X |
| 4,230,465 | 10/1980 | Hope | 55/261 X |
| 4,234,335 | 11/1980 | Weissert et al. | 60/39.46 R X |

FOREIGN PATENT DOCUMENTS 45-8320 3/1970 Japan .................................. 55/227
54-40207 3/1979 Japan .

*Primary Examiner*—Kathleen J. Prunner
*Attorney, Agent, or Firm*—Joseph W. Farley

[57] ABSTRACT

A system for recovering as power the pressure and sensible heat of the gas discharged from the top of a blast furnace by guiding the gas to a dry-type dust collector for the removal of dust while maintaining the gas at the furnace top pressure and introducing the gas into a turbine for expansion. To protect the dry-type dust collector when the gas is run off from the furnace at an abnormally high temperature, a gas channel extending from the furnace to the dust collector is provided with at least one injector, which injects a cooling fluid into the gas in response to a signal from a temperature detecting sensor disposed close to the gas outlet of the dust collector. The sensor which is positioned near the dust collector outlet detects the temperature without the time delay attributable to the deposition of dust. With use of the dry-type dust collector, the gas can be fed to the turbine almost without cooling for the recovery of an increased amount of power.

9 Claims, 10 Drawing Figures

SYSTEM FOR RECOVERING PRESSURE AND SENSIBLE HEAT FROM BLAST FURNACE GAS WITH USE OF DRY-TYPE DUST COLLECTOR

This is a continuation of application Ser. No. 147,200, filed May 6, 1980, now abandoned.

The present invention relates to a system for recovering as power the pressure and sensible heat of the gas discharged from the top of a blast furnace, and more particularly to such a system including a dry-type dust collector disposed upstream from a turbine.

With conventional systems for recovering the top pressure of blast furnaces as power, the blast furnace gas (hereinafter referred to as "B gas") discharged from the top of the furnace at a pressure of about 1.0 to 3 kg/cm$^2$ G and temperature of about 130° to 150° C. is passed through a dust catcher for the removal of coarse dust and then through a wet-type dust collector, such as a venturi scrubber or wet-type electric precipitator, for the removal of fine dust and is thereafter fed to a turbine disposed in parallel to a septum valve for adjusting the pressure of the gas in which turbine the gas is expanded to recover the pressure. To prevent the deposition of dust on the turbine blades, the following two methods are used.

a. The B gas sent out from the wet-type dust collector in a wet state at 40° to 60° C. is heated to about 120° to 140° C. by the combustion of part of the gas before being fed to the turbine to avoid condensation of water within the turbine by elevating the temperature of the gas to a sufficient level and thereby prevent deposition of dust on the turbine blades. This involves waste of energy needed for heating the B gas the temperature of which has been reduced in the wet-type dust collector.

b. The damp B gas from the wet-type dust collector is led directly into the turbine to wash away dust with droplets of water. To prevent abrasion of the blades with water droplets, the turbine is not provided with stationary blades (and is therefore inefficient) if it is of the radial-flow type, or is provided with blades in an increased number of stages (therefore expensive) to reduce the relative velocity of the gas, in the axial flow type.

These methods are not fully efficient for the recovery of power since power is recovered from the B gas passing through the wet-type dust collector and already cooled, whereas if it is possible to admit the B gas at 130° to 150° C. at which it is discharged from the top of the furnace, the power recovery efficiency of the turbine would increase by 20 to 35%. Although it appears feasible to replace the wet-type dust collector by a dry-type electric precipitator, bag filter or like dry-type dust collector for the removal of fine dust, such a dry-type dust collector generally is not suited to high temperatures. While stabilized flow of air through the blast furnace as well as a uniform gas distribution is contemplated for the operation of the furnace, the cross section of the furnace will locally involve abnormally reduced resistance to the flow of air which gives rise to abnormal variations in the air flow distribution or air supply pressure. This state is termed "blowing out." During blowing out, the B gas has a temperature of as high as 500° to 700° C. Thus there is the problem that the dry-type dust collector is unable to withstand such a high temperature.

Although a dry-type dust collector is known which is serviceable at high temperatures and which has incorporated therein a filter layer of sand or like granular solid, the collector still remains to be substantially improved for the filtration of dust, such as blast furnace dust, which is fine and adhesive.

The main object of the invention is to provide a system for recovering pressure and sensible heat from blast furnace gas with use of a dry-type dust collector without entailing the above problems.

To fulfill this object, the present invention provides a system for recovering pressure and sensible heat from blast furnace gas comprising cooling fluid supplying means disposed in a gas channel for holding a blast furnace in communication with a dry-type dust collector, and a temperature sensor disposed close to the gas outlet of the dry-type dust collector so that a cooling fluid is fed to the B gas by the supplying means on detection of an abnormal temperature by the sensor.

With this system, the B gas discharged from the top of the furnace can be led as it is to a turbine for the recovery of an increased amount of power. Additionally when the temperature of the B gas has increased to an abnormally high level, for example, due to the blowing out of the blast furnace, the gas is cooled rapidly and fed to the dry-type dust collector, which can therefore be protected from adverse effect. The sensor, which is positioned close to the outlet of the dust collector, detects the temperature without the delay that could result from the deposition of dust.

According to a preferred embodiment of the invention, the cooling fluid supplying means comprises a cooling fluid supplying pipe, an electrically operable valve mounted on the supplying pipe and cooling fluid injector means having one or a plurality of injection nozzles. The embodiment further includes a control device for calculating the desired degree of opening of the valve from the magnitude of a signal representing the difference between a detected temperature signal and a set temperature signal, preferably the variation ratio of the difference signal, and feeding the resulting signal to the electrically operable valve.

Another preferred embodiment of the invention includes a plurality of injector means each provided with an electrically operable valve in corresponding relation thereto. The desired degree of opening of the first valve is calculated first from the magnitude, preferably variation ratio, of the difference signal. When a difference signal is likely to result even if the first valve is fully opened, the degree of opening of the second valve is calculated, such that through a sequence of calculations the desired amount of cooling fluid is fed to the B gas from a required number of injection means.

With these preferred embodiments, an optimum amount of cooling fluid can be injected into the gas channel, whereby the dry-type dust collector can be protected from the detrimental influence that could result from excessive or insufficient injection. The latter embodiment, especially, is adapted for severe control of the gas temperature although the injector means are individually simple in construction and easy to operate.

According to another preferred embodiment, the electrically operable valves differ from one another in the maximum rate of flow therethrough, and the injector means are arranged along the gas channel at suitable spacing in such manner that the injector means corresponding to the valves of greater capacity in maximum flow rate are positioned toward the upstream side. With this arrangement, the cooling fluid is injected for cooling at a position toward the downstream side in the initial stage of rise of the gas temperature to minimize the delay to be involved and assure severe and steady control. Since the cooling fluid is injected in a smaller amount toward the downstream side, liquid droplets of the fluid are unlikely to migrate into the dry-type dust collector without evaporation and therefore will in no way degrade the component of the dust collector or act to deposit dust on the component. Accordingly inexpensive water is satisfactorily usable as the cooling fluid.

To prevent liquid droplets from migrating into the dry-type dust collector, the injector means is mounted preferably on the top of the blast furnace or on a duct portion extending upward from the top, as directed toward the interior of the furnace. At a desired portion of the gas channel from the furnace to the dry-type dust collector, there is provided a passage whereby the gas flowing downward straightly or in a swirling fashion is turned upward. The injector means is disposed near the position where the gas flow is turned.

Various other features and advantages of the invention will become apparent from the description of the preferred embodiments given below with reference to the accompanying drawings, in which.

Figure 1:
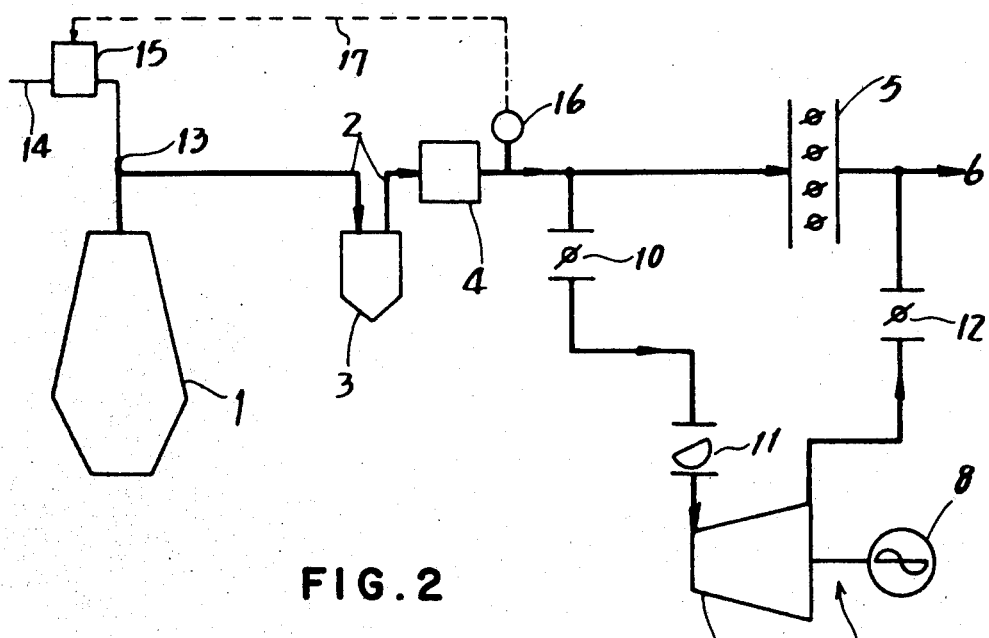
FIG. 1 is a system diagram showing a first embodiment of this invention.

With reference to FIG. 1, the B gas discharged from the top of a blast furnace 1 and having a temperature of about 130° to 150° C. is passed through a dust catcher 3 disposed at an intermediate portion of a gas channel 2 for the removal of coarse dust and led into a dry-type dust collector 4, such as bag filter, dry-type electric precipitator, or the like. The dedusted B gas is passed through a septum valve 5 for the adjustment of its pressure and guided to an unillustrated gas holder 6. A generator 7 in parallel with the septum valve 5 comprises a dynamo 8 and a turbine 9 for driving the dynamo 8. The B gas is fed to the turbine 9 from the inlet side of the septum valve 5 through an inlet shutoff valve 10 and a turbine governor valve 11. After driving the turbine 9, the B gas is run off through an outlet shutoff valve 12 to the outlet side of the septum valve 5. At an intermediate portion of the gas channel 2 extending from the blast furnace 1 to the dust collector 4, there is provided injector means 13 having one or a plurality of injection nozzles for injecting a cooling fluid into the channel 2. A cooling fluid supplying pipe 14 is connected to the injector means 13 and provided at an intermediate portion thereof with a flow rate control assembly 15 for controlling the amount of injection of the cooling fluid from the injector means 13. Disposed close to the gas outlet of the dust collector 4 is a sensor 16 for detecting the temperature of the B gas from the collector 4 and feeding a detected temperature signal 17 to the control assembly 15. For example, the control assembly 15 comprises a control device for emitting a signal when the detected temperature is higher than a preset temperature, and a valve for opening the supplying pipe 14 in response to the signal from the control device.

Figure 9:
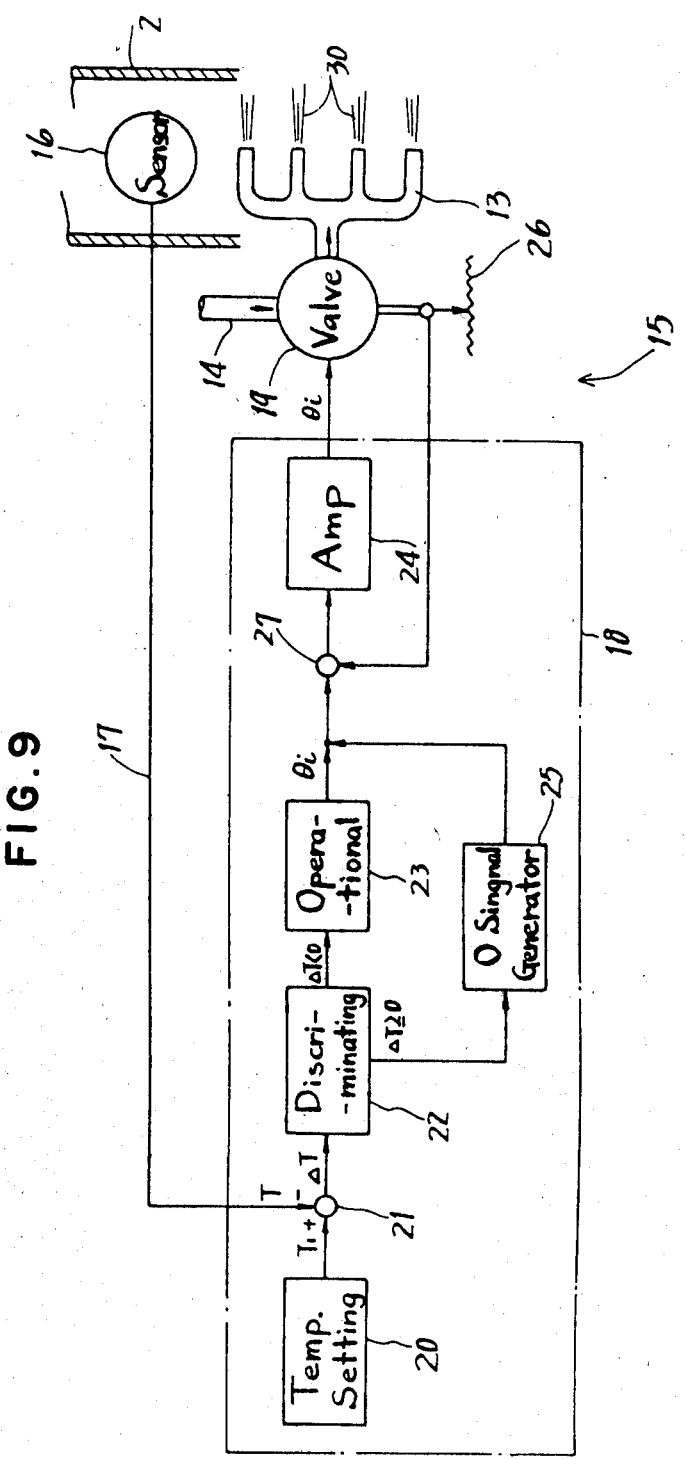
FIG. 9 is a block diagram showing a control assembly of the first embodiment.

Preferably control assembly 15 is adapted to adjust the degree of opening of the valve in accordance with the difference between the set temperature and the detected temperature, as illustrated in FIG. 9. Stated more specifically, a control device 18 comprises a temperature setting unit 20, an adding unit 21 for receiving a set temperature signal $T_1$ thereof and a detected temperature signal T from the sensor 16, a discriminating unit 22 for receiving a signal $\Delta T$ representing the difference between these signals, namely $\Delta T = T_1 - T$, and produced from the adding unit, an operational unit 23 for receiving the signal $\Delta T$ from one output terminal of the discriminating unit 22 when $\Delta T < 0$, an amplifier 24 for giving output by amplifying a signal $\theta i$ from the operational unit 23, and a zero signal generator 25 for feeding a zero signal to the amplifier 24 in response to a signal emitted by another output terminal of the discriminating unit 22 when $\Delta T \geq 0$. The signal $\theta i$ indicates the degree to which an electrically operable valve 19 on the cooling fluid supplying pipe 14 is to be opened. The output from the amplifier 24 is fed to the valve 19. A potentiometer 26 for detecting the actual degree of opening of the valve 19 feeds an output signal to an adding unit 27 on the input side of the amplifier 24 to provide a servo means. Thus the degree of opening of the valve 19 is controlled in accordance with the difference between the set temperature and the detected temperature, and the amount of the cooling fluid to be injected from the injector means 13 is adjusted in accordance with the degree of opening of the valve to control the degree of cooling of the B gas.

The operational unit 23 magnifies the valve opening degree signal in proportion to $-\Delta T$ in view of the cooling effect and further increases the opening degree signal in corresponding relation to the increase of temperature per unit time in order to compensate for the thermal inertia of the system. The signal emitted from the unit 23 is also such that when a temperature above the set temperature starts to decrease, the opening of the valve is reduced or the valve is entirely closed as desired, in accordance with the temperature or the rate of the decrease per unit time. The operation transmitting function of the operational unit 23 is represented, for example, by $$k\left(1 + \frac{T_D S}{1 + T_F S}\right)$$

where k is a proportional constant, S is a Laplace operator, $T_D$ is a differential time constant, and $1 + T_F S$ represents a filter. Without the filter, the valve opening degree signal θi obtained by differentiation with $T_DS$ would change greatly in the event of a marked temperature change, subjecting the valve 19 to a severe operation. The filter serves to mitigate such operation. $T_F$ is a filter time constant.

Figure 2:
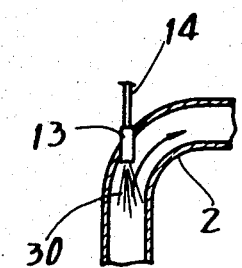
FIG. 2 is an enlarged view in section showing injector means included in the embodiment and mounted in place.

As seen in FIGS. 1 and 2, the injector means 13 is mounted, and is directed downward, on an intermediate upwardly extending duct portion of the gas channel 2 to inject the cooling fluid 30 into the channel 2 against the flow of B gas from the blast furnace and thereby effectively cool the gas.

Figure 3:
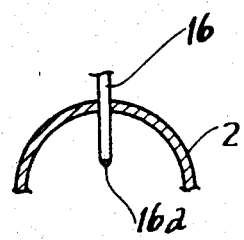
FIG. 3 is an enlarged view in section showing a sensor mounted in place and included in the same embodiment.
Figure 4:
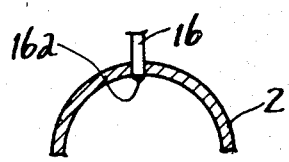
FIG. 4 is a view similar to FIG. 3 and showing a sensor as mounted in place in a modified mode.

The sensor 16 is provided downstream from the dry dust collector 4, whereby the sensor 16 is prevented from being covered with dust that would cause a delay when detecting an abnormal temperature. When the amount of dust upstream from the dust collector 4 is 3 to 10 g/Nm$^3$ (wherein N means standard conditions, i.e. 0° C. and atmospheric pressure of 1.033 Kg/cm$^2$), the amount of dust downstream therefrom is up to 10 mg/Nm$^3$. Further as seen in FIG. 3, the sensor 16 disposed in the gas channel 2 close to the outlet of the dust collector 4 has its temperature measuring portion 16a exposed directly to the B gas to avoid a time delay when detecting the temperature. The time delay (up to 2 seconds) resulting from positioning the sensor 16 downstream from the dust collector 4 poses substantially no problem. Since the delay of the injection of the cooling fluid relative to the detection of the temperature is up to 1 second, the combined time delay is about 3 seconds. The rise of temperature in the initial stage of blowing out is up to 15° C./sec, so that the rise of the gas temperature during the delay of about 3 seconds is as small as 45° C. Now a bag filter having a maximum operating temperature of 240° C. is considered. If the temperature setting is 170° C., the gas to which the cooling fluid 30 is to be applied has a temperature of 170° C.+45° C.=215° C., at the highest. This level is well below the maximum operating temperature. When the temperature detected by the sensor 16 is not higher than the set temperature, no signal 17 is produced, and the valve 19 is held closed to interrupt the injection of the fluid 30. Since the gas channel 2 involves a temperature distribution, it is preferable to position the temperature measuring portion 16a of the sensor 16 at the top portion of the cross section of the gas channel where the gas flow has the highest temperature.

Useful cooling fluids are cooling gases for utilizing sensible heat and cooling liquids for utilizing latent heat. Useful cooling gases are those which are unlikely to render the B gas damp and include (a) water vapor at 3 to 6 atg (gauge pressure), (b) inert gases such as N$_2$ and CO$_2$, and (c) reducing gases such as B gas, coke oven gas, etc. The cooling liquid must be such that it can be completely evaporated in the B gas before the gas reaches the dry-type dust collector 4 so as not to agglomerate dust particles. Useful liquids are (d) water, and (e) light liquid fuel, liquefied gas fuel, etc. In the case of the fuels (e), the fuel, when injected, will evaporate and become mixed with the B gas, giving an increased calorific value to the gas without entailing any fuel loss. Such cooling liquid is usable with smaller piping and requires a smaller power for injection than the cooling gases.

Figure 5:
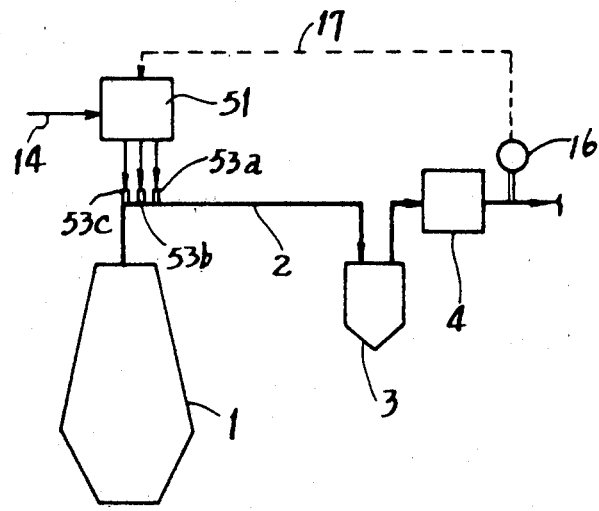
FIG. 5 is a fragmentary system diagram showing a second embodiment of the invention.

FIG. 5 shows a second embodiment. A gas channel 2 is provided at intermediate portions thereof with a plurality of injector means 53a, 53b and 53c. A flow rate control assembly 51 for controlling the amounts of cooling fluid to be injected from the injector means is provided between a cooling fluid supplying pipe 14 and the injector means 53a to 53c. A detected temperature signal 17 is fed to the control assembly 51 from a sensor 16. The control assembly 51, which will be described in greater detail with reference to FIG. 10 at the end of the specification, comprises a control device and a plurality of electrically operable valves corresponding to the injector means. When the temperature detected by the sensor 16 has exceeded the temperature setting, the control device opens the valves in succession in accordance with the temperature difference, or with the difference and the rate of increase of the temperature to cause the injector means 53a to 53c to successively inject the cooling fluid into the gas channel 2. Stated more specifically, the cooling fluid is injected from the first injector means 53a first, and when the maximum amount of injection has been reached, the second injector means 53b and then third injector means 53c are caused to inject the fluid in succession. While the injector means 53a to 53c are collectively mounted on an upper portion of a duct extending upward from the top of the blast furnace in FIG. 5, the location of the injector means can be altered suitably. They can be arranged along the gas channel 2 at suitable spacing.

Figure 6:
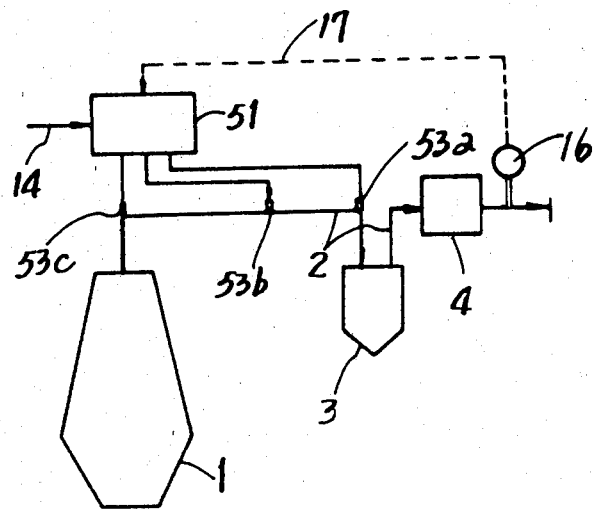
FIG. 6 is a fragmentary system diagram showing a third embodiment of the invention.

FIG. 6 shows a third embodiment which is basically similar to the second embodiment. Injector means 53a to 53c are arranged along the gas channel 2 at suitable spacing. The electrically operable valve corresponding to the first injector means 53a at the most downstream position is smallest in maximum flow rate, while the electrically operable valves corresponding to the second and third injector means 53b and 53c positioned toward the upstream side have a maximum flow rate progressively increased toward the upstream side. The valves are opened one after another to operate the injectors successively from the downstream side toward the upstream side. The valves may have the same capacity and be limited in maximum degree of opening, or valves of varying capacities are usable for giving maximum flow rates.

Figure 7:
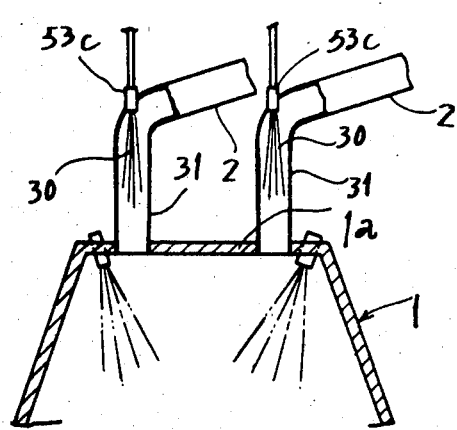
FIG. 7 is an enlarged view in section showing an arrangement of injector means near the top of a blast furnace according to the embodiment of FIG. 6.
Figure 8:
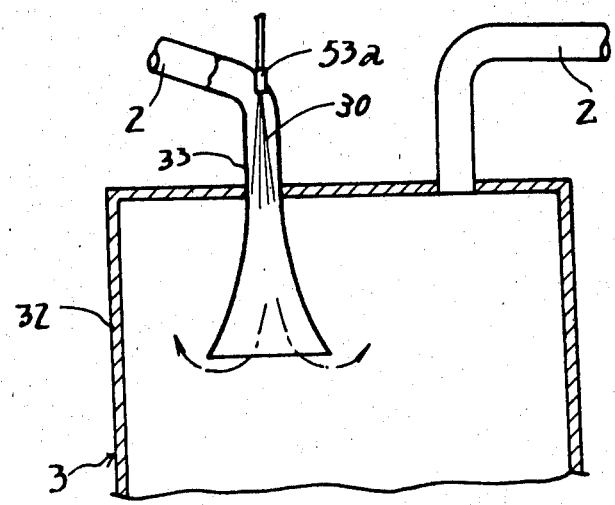
FIG. 8 is an enlarged view in section showing an arrangement of injector means provided close to the upper end of a dust catcher at an intermediate portion of a gas channel.

In FIG. 6, the injector means 53a at the most downstream position is disposed close to the upper end of the dust catcher 3, while the injector means 53c at the most upstream position is disposed near the top of the blast furnace 1. FIG. 7 shows injector means 53c in solid lines each of which is mounted on an upper part of a duct portion 31 extending upward from the top of the furnace and serving as the gas channel 2. When desired, the injector means 53c may be provided at base portions of the ducts 31, or on the furnace top portion 1a as indicated in phantom lines. The injector means 53c are adapted to inject the fluid toward the interior of the blast furnace 1. With this arrangement, coarse drops of liquid fall onto the charge including coke and ore and spontaneously evaporate. Further as shown in FIG. 8, the injector means 53a is mounted on an upper portion of an inlet duct 33 extending vertically downward into the chamber 32 of the dust catcher 3 and is directed toward the interior of the chamber 32. In this case, coarse liquid drops separate from the B gas and spontaneously fall due to their inertia, at a location where the gas flowing out from the lower end of the inlet duct 33 turns upward. Thus the liquid drops will not reach the dust collector 4 at a downstream position. The optimum location of the most downstream injector means 53a is not limited to that shown in FIG. 8, insofar as there is provided a passage whereby the B gas flowing downward straightly or in a swirling fashion is turned upward so that the injector means is disposed near the position of upward turn of the gas flow.

Finally the construction and operation of the flow rate control assembly 51 mentioned above will be described with reference to FIG. 10. Throughout FIGS. 9 and 10, like parts are referred to by like reference numerals, and those which are more than one in number are referred to with use of suitable suffix numbers to omit a detailed description.

A set temperature signal $T_1$ from a temperature setting unit 20 and a detected temperature signal T from the sensor 16 are fed to an adding unit 21. The difference $\Delta T$, namely $T_1-T$, is applied to a discriminating unit 22. When $\Delta T<0$, namely, when the signal T representing the temperature of the B gas detected indicates a higher value than the set temperature signal $T_1$, a difference signal $\Delta T$ is fed to an operational unit 23 having the same function as already described with reference to FIG. 9. An output signal $\theta i$ serves to open electrically operable valves 54-1, 54-2 and 54-3. On the other hand, if $T \geq 0$, namely, when the temperature of the B gas is not higher than the temperature setting, the discriminating unit 22 changes the signal transmitting path to the unit 23 and applies the difference signal to a zero signal generator 25-1, which in turn feeds a signal to an amplifier 24-1 to give a zero valve opening degree, whereby the valve is closed to discontinue the injection of the cooling fluid 30 from the injector means and interrupt cooling of the fluid 30.

Figure 10:
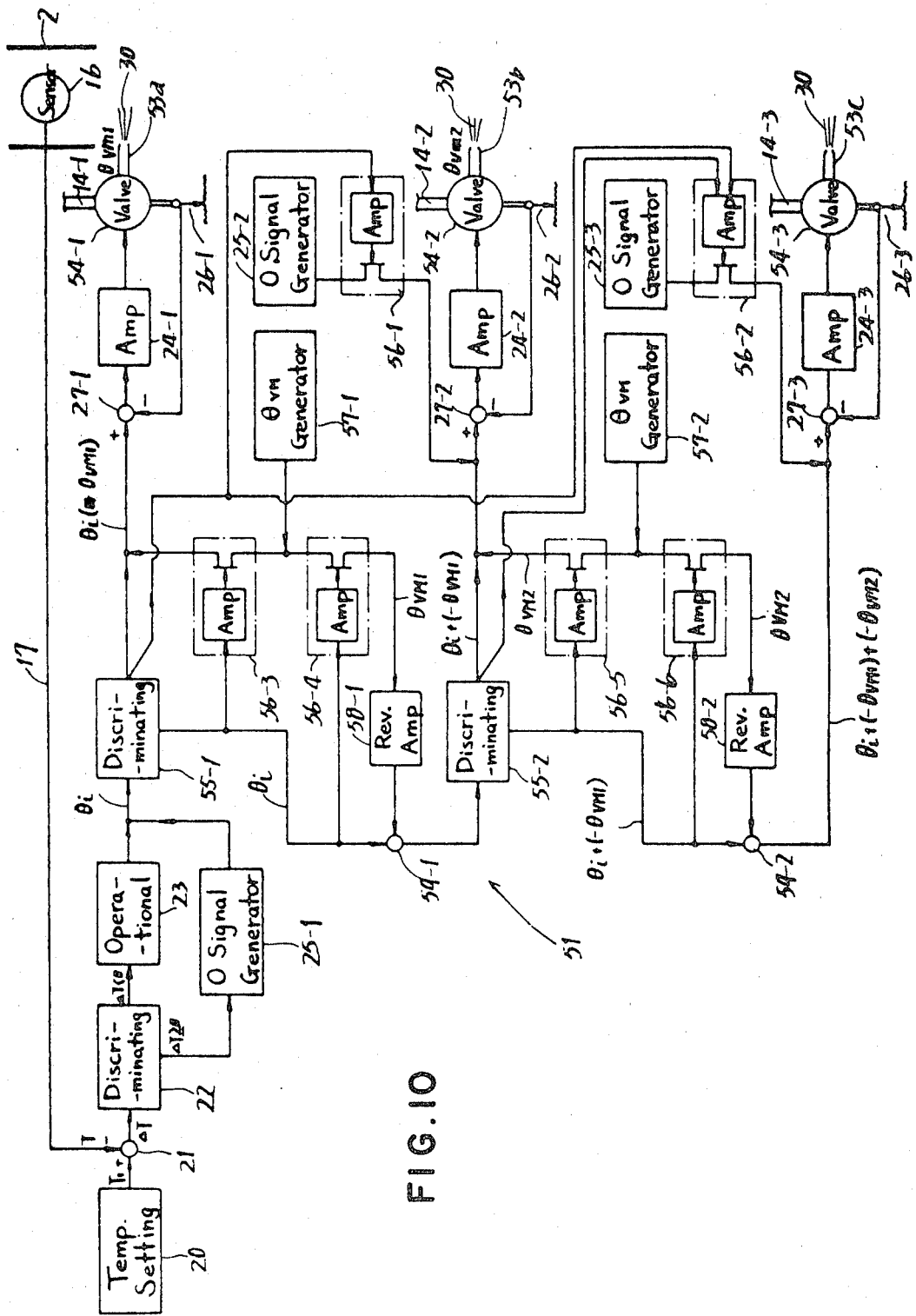
FIG. 10 is a block diagram showing a control assembly of the second and third embodiments.

The output signal $\theta i$ from the operational unit 23 is fed to a first discriminating unit 55-1. When the signal $\theta i$ is smaller than the maximum amount of injection $\theta_{VM1}$ of the valve 54-1, the unit 55-1 gives the signal $\theta i$ to the first amplifier 24-1. The signal $\theta i$ and the signal $\theta$ from the first potentiometer 26-1 are fed to a first adding unit 27-1, and the difference is amplified by the first amplifier 24-1 to give an opening degree signal. Thus the first valve 54-1 is operated by so-called servo means. In accordance with the opening of the first valve 54-1, the amount of the fluid 30 to be injected from the injector means 53a is controlled to control the degree of cooling of the B gas. At this time, the second and third valves 54-2, 54-3 are connected to second and third zero signal generators 25-2, 25-3 by first and second switching circuits 56-1, 56-2, respectively and are controlled to zero opening degree. When the signal $\theta i$ is greater than the maximum amount of injection $\theta_{VM1}$ of the first valve 54-1, the signal $\theta i$ is given to a third switching circuit 56-3, which connects a first $\theta_{VM}$ generator 75-1 to the first amplifier 24-1. In the case of the third embodiment, therefore, a signal $\theta_{VM1}$ fully opens the first valve 54-1 which is in the most downstream position and is smallest in maximum amount of injection. At the same time, the signal $\theta i$ is given to a fourth switching circuit 56-4, which is energized to give the signal $\theta_{VM1}$ from the generator 57-1 to a first polarity reversing amplifier 58-1, which in turn gives output $-\theta_{VM1}$. The signal $-\theta_{VM1}$ and the signal $\theta i$ from the first discriminating unit 55-1 are fed to an adding unit 59-1, which gives a signal $\theta i+(-\theta_{VM1})$ to a second discriminating unit 55-2. When this signal $\theta i+(-\theta_{VM1})$ is smaller than $\theta_{VM2}$, the signal is given to a second amplifier 24-2 as an opening degree signal for the second valve 54-2, which is thereby suitably controlled. At the same time, the signal $\theta i(-\theta_{VM1})$ is given to the second switching circuit 56-2 to connect the third zero signal generator 25-3 to the third valve 54-3. Consequently a zero signal fully closes the valve 54-3. When the signal $\theta i+(-\theta_{VM1})$ is larger than $\theta_{VM2}$, a fifth switching circuit 56-5 causes a second $\theta_{VM}$ generator 57-2 to emit a signal $\theta_{VM2}$ which fully opens the second valve 54-2 in the same manner as above. A sixth switching circuit 56-6 is energized to feed the signal $\theta_{VM2}$ from the generator 57-2 to a second polarity reversing amplifier 58-2. The resulting output $-\theta_{VM2}$ and the output $\theta i+(-\theta_{VM1})$ from the second discriminating unit 55-2 are fed to an adding unit 59-2. The sum $\theta i+(-\theta_{VM1})+(-\theta_{VM2})$ is given to a third amplifier 24-3 as an opening degree control signal for the third valve 54-3, which is therefore suitably controlled by the signal. Since the signal $\theta_{VM1}$ is fed from the first $\theta_{VM}$ generator 57-1 to the first amplifier 24-1 through the third switching circuit 56-3 at this time, the first valve 54-1 is held fully open. To prevent each of the valves 54-1, 54-2 and 54-3 from turning excessively beyond the fully open and closed positions, the valves can be provided with limiters at the fully open and closed positions when so desired to interrupt the flow of current to the valves. Indicated at 26-2 in FIG. 10 is a second potentiometer, at 26-3 a third poteniometer, at 27-2 a second adding unit, and at 27-3 a third adding unit.

What is claimed is:

1. In a system for recovering as power, pressure and sensible heat from a gas discharged from the top of a blast furnace, including a gas channel which conducts the gas from the blast furnace to a dust collector means for the removal of dust while maintaining the gas at furnace top pressure and which feeds the gas from the dust collector means into a turbine for expansion, the improvement wherein:

said dust collector means comprises a dry-type bag filter or electric precipitator installed in said gas channel for cleaning the gas without substantial cooling of the gas from a normal high temperature of 130° to 150° C.;

supply means for supplying a cooling fluid to said gas channel between the blast furnace and said dust collector means, said supply means including pipes connecting said supply means with first, second and subsequent injectors arranged along and exposed to the interior of said gas channel at suitable spacing, each injector being provided with an electrically operable valve, the valves differing from one another in the maximum rate of flow therethrough with the valve of smaller maximum flow rate being provided on said first injector, and said first injector being positioned closer to the downstream side with respect to the flow of the gas;

sensor means for detecting the temperature of the gas is disposed in the gas channel close to the gas outlet of said dust collector means; and control means connected to said sensor means and to said injector valves for opening at least one of said injector valves in response to the gas temperature detected by said sensor means exceeding a specified value set above said normal high temperature and below the maximum temperature said dust collector means can endure, the control means being adapted to feed opening signals to the injector valves starting with the valve provided on the first injector on the downstream side and from valve to valve toward the upstream side, and the control means being adapted to calculate a desired degree of opening of the first injector valve from the magnitude of a signal representing the difference between the detected temperature signal from said sensor means and the set temperature signal and feed the resulting signal to the first injector valve, to further calculate a desired degree of opening of the second injector valve and feed the resulting signal to the second injector valve when the difference signal can result even when the first injector valve is fully opened, and to further calculate a desired degree of opening of each subsequent injector valve in succession and feed the resulting signal to the corresponding injector valve when the difference signal can result even when each preceding injector valve is fully opened.

2. A system as defined in claim 1 wherein at least one of said injectors is directed toward the interior of the blast furnace and is mounted on a top portion of the furnace or on an upward portion of a gas duct extending from the top of the furnace.

3. A system as defined in claim 1 wherein the gas channel is provided at an intermediate portion thereof with a passage means having portions for causing the gas to flow downward and thereafter turn upward, and at least one of said injectors is disposed in the downward portion of said passage means.

4. A system as defined in claim 1 wherein the control means calculates the desired degree of valve opening from the magnitude of the difference signal and the variation ratio thereof.

5. A system as defined in claim 1 wherein the cooling fluid is a gas substantially not reactive with the blast furnace gas.

6. A system as defined in claim 5 wherein the cooling gas is at least one gas selected from the group consisting of $N_2$, $CO_2$, blast furnace gas and coke oven gas.

7. A system as defined in claim 1 wherein the cooling fluid is a liquid which evaporates by the heat of the blast furnace gas, and the resulting gas is substantially not reactive with the blast furnace gas.

8. A system as defined in claim 7 wherein the cooling liquid is at least one liquid selected from the group consisting of water, light liquid fuel and liquefied gas fuel.

9. A system as defined in claim 1 wherein the sensor means has a temperature measuring portion positioned at an upper portion of the gas channel close to the outlet of the dust collector means.

* * * * *